Nov. 22, 1927.

F. MÜLLER 1,649,845

CHAIN AND PART THEREFOR

Filed Aug. 17, 1923     2 Sheets-Sheet 1

INVENTOR.

Friedrich Müller

Nov. 22, 1927. 1,649,845

F. MÜLLER

CHAIN AND PART THEREFOR

Filed Aug. 17, 1923    2 Sheets-Sheet 2

INVENTOR.
Friedrich Müller

Patented Nov. 22, 1927.

1,649,845

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

CHAIN AND PART THEREFOR.

Application filed August 17, 1923. Serial No. 657,881.

My invention more particularly relates to a link chain of the silent type which is efficient, durable, cheap and is quiet in operation.

My invention consists of certain novel parts and combinations of parts particularly pointed out in the claims.

Figure 1:
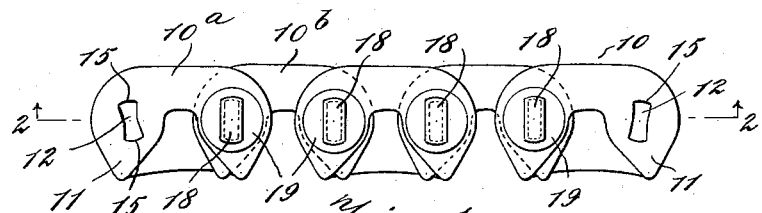
Figure 2:
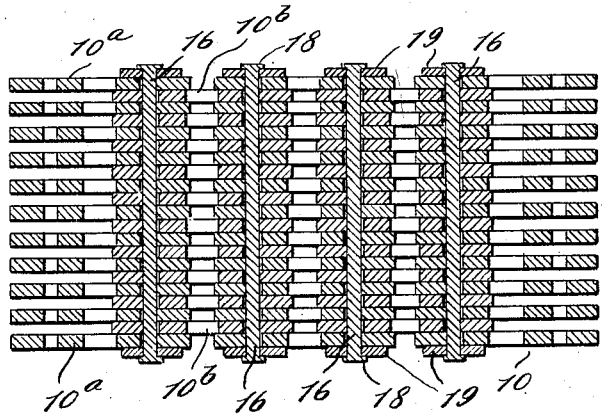
Figure 3:
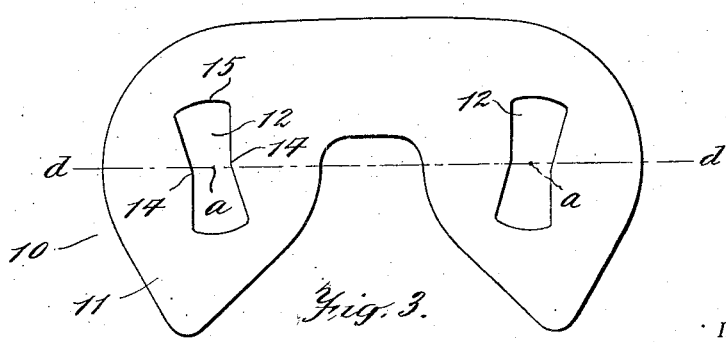
Figure 4:
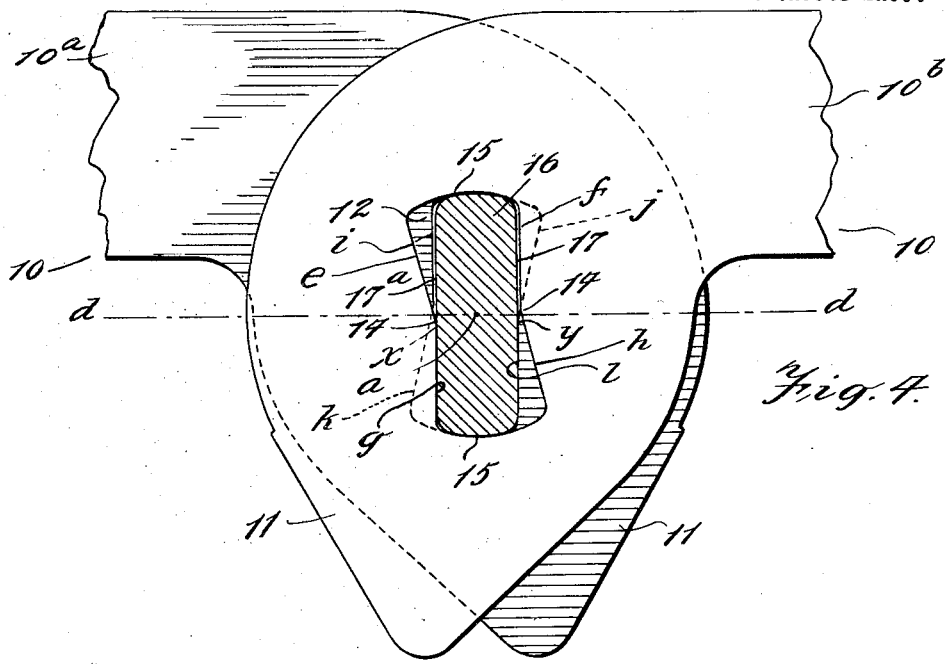

The following is a description of a link chain embodying my invention in the form at present preferred by me, but it will be understood that various modifications and changes may be made therein without departing from the spirit of my invention and without exceeding the scope of my claims. My invention will best be understood by reference to the accompanying drawings in which I have illustrated the preferred embodiment of my invention, and in which Figure 1 is a side view of a chain embodying my invention; Fig. 2 is an inverted sectional plan view taken along the plane of the line 2, 2 of Fig. 1; Fig. 3 is a side view of a single link; Fig. 4 is a sectional elevation, on an enlarged scale, illustrating the positions assumed by the links of adjacent pitches and the pin passing through the openings therein on a straight run of the chain, and Fig. 5 is a view similar to Fig. 4, illustrating the joint between the two pitches flexed.

Like reference characters indicate like parts throughout the drawings.

In outline, the links indicated generally at 10 are similar to links heretofore employed in this type of chain, 11 being one of the teeth thereof which engage the teeth of the sprocket wheel over which the chain passes. The links may also correspond in thickness and material to links of this class heretofore used.

Figure 5:
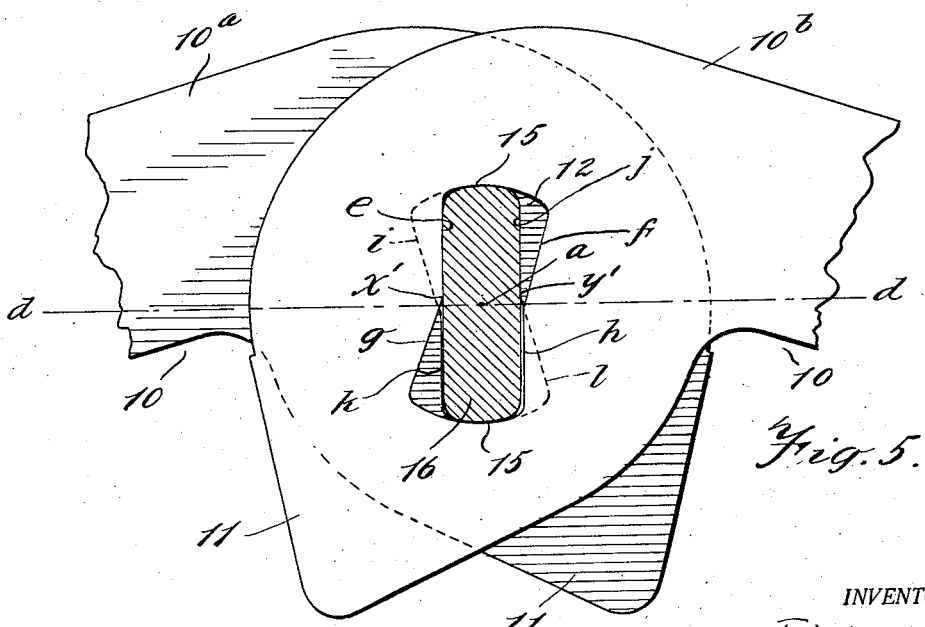

Each link is provided at each end with an opening 12 which, in the form illustrated, flares outwardly at each end, as shown in Figs. 3, 4 and 5, the walls around the opening preferably presenting substantially flat faces $e$, $f$, $g$ and $h$ for the opening in the link $10^b$ and $i$, $j$, $k$ and $l$ for the opening in the link $10^a$, intersecting at 14, 14, through the flaring effect, as will later appear, may be produced by outwardly flaring the faces on one side only of the opening. The ends of the opening are preferably symmetrically arranged about the line joining the edges of the intersecting faces of the link walls, said line being the line of minimum length from edge to edge of the opening. The ends of the opening 12 are preferably arcs of circles, as indicated at 15.

The links $10^a$ of one pitch are interspersed at their ends with the ends of the links $10^b$ of an adjacent pitch. In the form shown, the links of one pitch alternate at their ends with the ends of the links of an adjacent pitch, though it will, of course, be understood that the links may otherwise be grouped or arranged. The links are connected together by a pin 16, preferably but not necessarily made of a single piece of metal, passing through the openings of the links, the sides 17 and $17^a$, Fig. 4, of which are preferably substantially plain or flat, and preferably parallel, the sides forming bearing surfaces for the link walls around the opening.

The side walls of the openings 12 of the links are so formed with respect to the pin 16, that on a straight run of the chain, the faces of the openings, or portions thereof, of the links of one pitch engage one side of the pin 16, and the opposite side of the pin engages the faces of the openings, or portions thereof, of the links of adjacent pitches. For example, in Fig. 4 the pin 16 engages on its left side the face $g$, or a portion thereof, of the links of one pitch, represented by the link $10^b$, while the right-hand side of the pin 16 engages the face $l$, or a portion thereof, of the links of the adjacent pitch, represented in Fig. 4 by the link $10^a$.

Now, when a joint of the chain is flexed as indicated in Fig. 5, the edges of the link walls formed by the intersection of the upper and lower flat walls, and indicated in Fig. 4 at $x$, $y$, form bearing surfaces against the pin 16 and about which the links slide and rock. In moving from the position assumed in a straight run of the chain, as illustrated in Fig. 4, to the flexed position, indicated in Fig. 5, the links $10^a$ and $10^b$ slide and rock about the bearing edges $x$ and $y$, respectively, and the bearing edges slide from a position below the horizontal center line $d$, $d$, slightly along the surface of the pin 16, and when flexed to the extent indicated in Fig. 5, slide to positions above the center line and indicated at $x'$, $y'$ in Fig. 5, the lines of force always being at right angles to the side of the pin. In a straight run of the chain, the engagement between the sides 17 and 17ª of the pin and the faces $l$ and $g$ of the link walls is formed between surfaces that are subjected to no part of the sliding or rocking movement above described between the pin and the link walls, and on which, therefore, there is no substantial wear. Any wear, therefore, occasioned by the said sliding or rocking movement, and which takes place during the pivotal movement of the joint, does not affect the bearing surfaces between the pin and the link walls which engage in a straight run of the chain, and therefore does not affect the length of the straight part of the chain between sprockets. Such wear affects the length of the chain only in the part that is passing over the sprockets, and this part is inconsiderable as compared with the straight part. In other words, elongation as the result of wear in a chain embodying my invention is slight as compared with other chains of the same type.

The center of motion $a$ is located within the pin 16, as indicated in Figs. 4 and 5. It will be understood that preferably one side only of the link wall surrounding a given opening bears against the pin 16. For example, the edge $e$ of the link wall at the left of the opening in Fig. 5 bears against the pin 16, while the right-hand wall $h$ of the same opening is preferably spaced somewhat from the pin as indicated; so also, in Fig. 4, the edge $g$ of the link wall at the left of the opening bears against the pin 16, while the right-hand wall $f$ of the same opening is preferably spaced somewhat from the pin as indicated; and, in fact, the link walls $h$ and $f$ at the right of the opening could further be cut away without detriment to the operation of the chain. The same is true with respect to the walls $i$ and $k$.

The pins 16 are shown as secured in position in the chain by peening over their ends as at 18, suitable washers 19 being interposed between the peened ends of the pins and the side links of the chain as illustrated in Fig. 2.

I claim:—

1. In a chain, a plurality of side-by-side links provided with openings, said openings being elongated, and a unitary connecting pin passing through said openings, said pin being elongated in cross section, and free to move independently of said links, the openings and pin affording separate engaging surfaces when the adjacent links are moving in a straight line and when they are moving in other than a straight line.

2. In a chain, a plurality of side-by-side links provided with openings, said openings being elongated, and a unitary connecting pin passing through said openings, said pin being elongated in cross section, and free to move independently of said links, the engaging surfaces between the openings and the pin in a straight-line run of the chain being independent of the engaging surfaces between the same in a curved line run of the chain.

3. In a chain, a plurality of side-by-side overlapping links provided with similar openings, said openings being elongated, and a unitary connecting pin passing through said openings, said pin being elongated in cross section, the center of motion being located within said pin.

4. In a chain, a plurality of side-by-side overlapping links provided with similar openings, said openings being elongated, and a unitary connecting pin passing through said openings, said pin being elongated in cross section, the openings and pin affording relatively broad engaging surfaces when the adjacent links are moving in a straight line and relatively narrow engaging surfaces when they are moving in other than a straight line.

5. A chain link provided with a pivot pin opening uniformly flared outwardly at opposite ends to permit flexing of the joint.

6. A chain link provided with a pivot pin opening flared outwardly at opposite ends to permit flexing of the joint, the sides of said opening being formed by link walls presenting substantially flat intersecting faces.

7. In a chain, a plurality of side-by-side links provided with openings, a connecting pin passing through said openings and forming a rocking and sliding engagement with said links, said connecting pin having substantially flat parallel opposite sides.

8. In a chain, a plurality of side-by-side links provided with openings flared outwardly at opposite ends, and a single pin passing through said openings and forming a rocking and sliding engagement at its sides with link walls.

9. In a chain, a plurality of side-by-side links provided with openings outwardly flared at opposite ends, the side walls of said openings presenting substantially flat intersecting faces, and a connecting pin passing through said openings and provided with substantially flat sides forming a rocking and sliding engagement with the link walls around said openings.

FRIEDERICH MÜLLER.